No. 812,932. PATENTED FEB. 20, 1906.
K. KIEFER.
FILTERING ELEMENT.
APPLICATION FILED APR. 7, 1904.

5 SHEETS—SHEET 1.

Witnesses
G. W. Worden
H. L. Rambeau

Inventor
Karl Kiefer

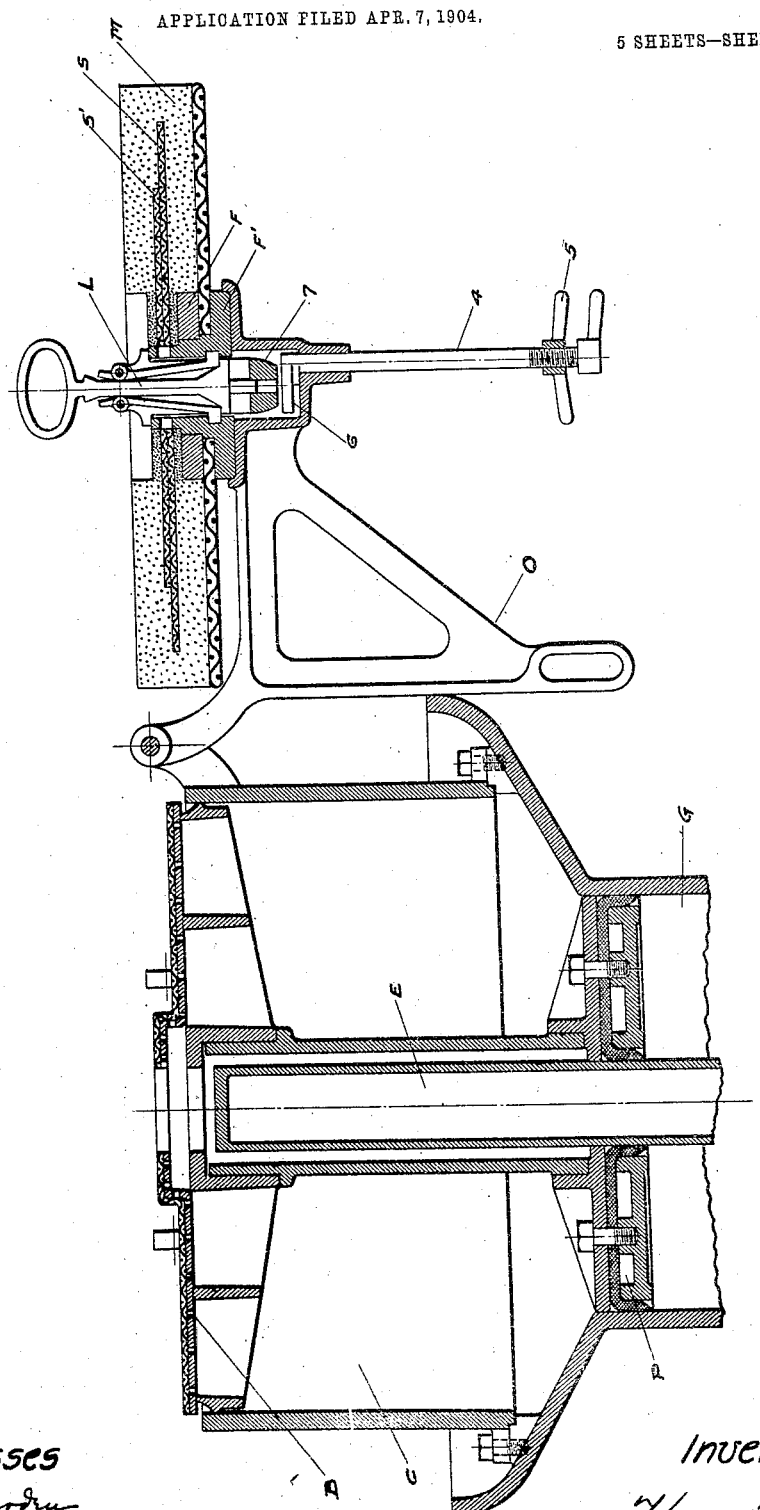

UNITED STATES PATENT OFFICE.

KARL KIEFER, OF CINCINNATI, OHIO.

FILTERING ELEMENT.

No. 812,932. Specification of Letters Patent. Patented Feb. 20, 1906.

Application filed April 7, 1904. Serial No. 202,105.

*To all whom it may concern:*

Be it known that I, KARL KIEFER, a citizen of the United States, residing at Cincinnati, in the county of Hamilton and State of Ohio, have invented a new and useful Improvement in Filtering Elements, of which the following is a specification.

My invention relates to filter elements of compressed pulp, usually circular and disk-shaped and superimposed upon each other and inclosed within an air-tight drum—such, for instance, as are shown in my Patent No. 779,607, January 10, 1905.

The purpose of this invention consists in certain novel constructions that simplify the construction and operation of such filter elements.

It also consists in novel means for preventing the cloudy liquid between the filter elements from entering the clear side of the filter layers.

In the filter elements as shown in my above patent the embedded liquid-conductor is used for the conveyance of the clear liquid, while the separating liquid-conductor is used for the conveyance of the cloudy liquid.

Figure 1:
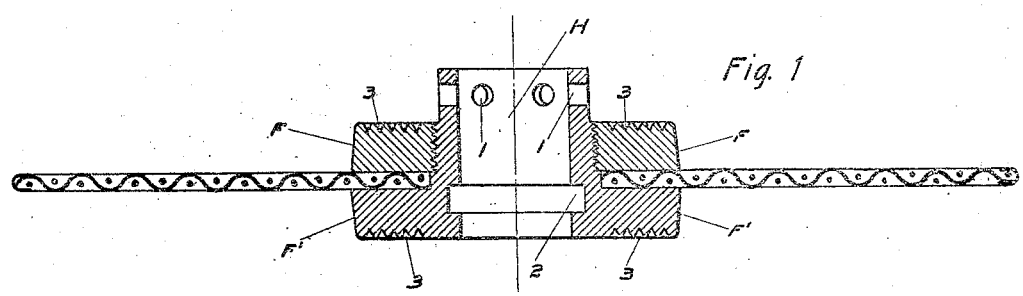
Figure 2:
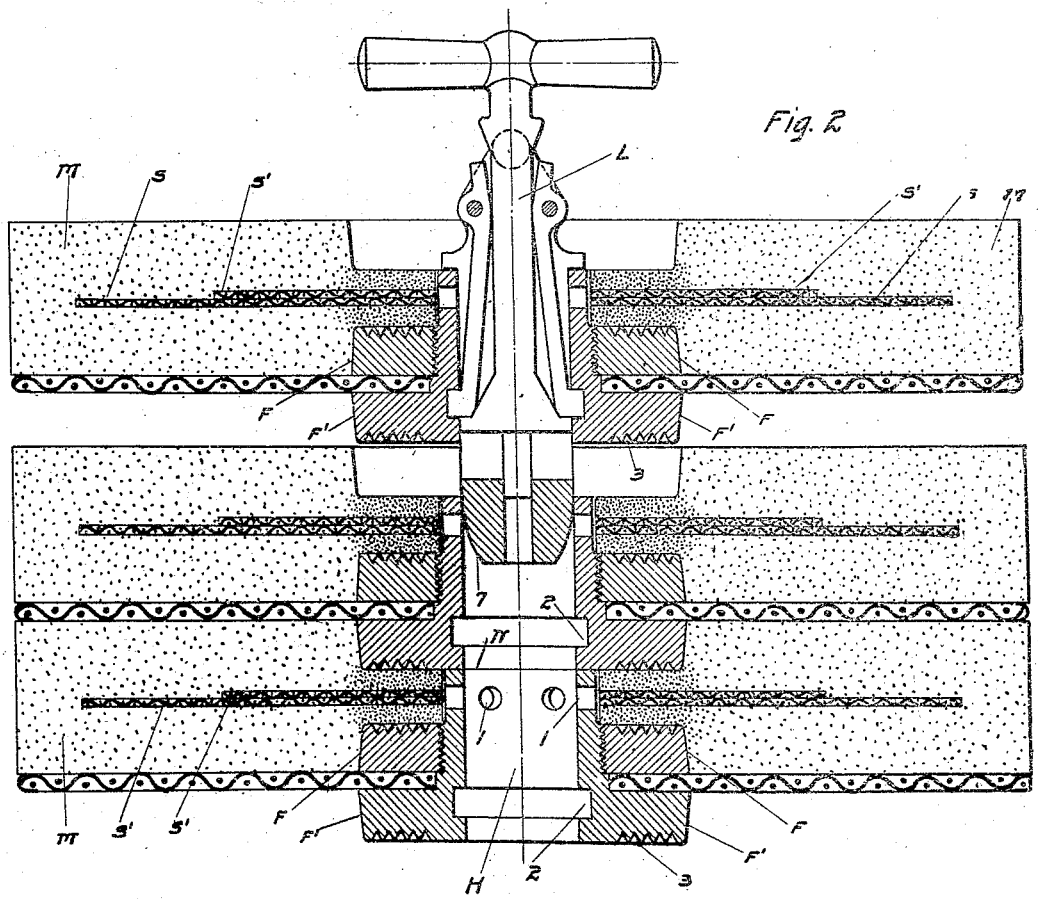
Figure 3:
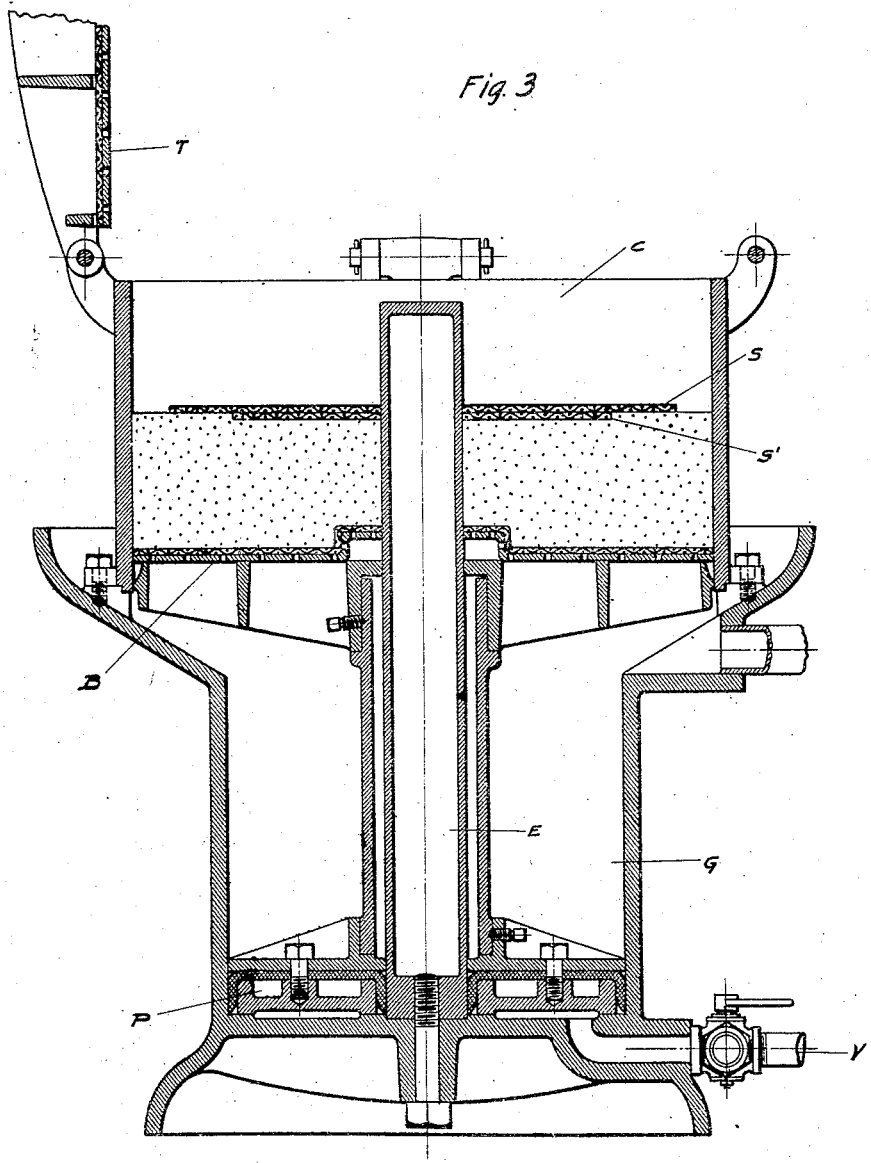
Figure 4:
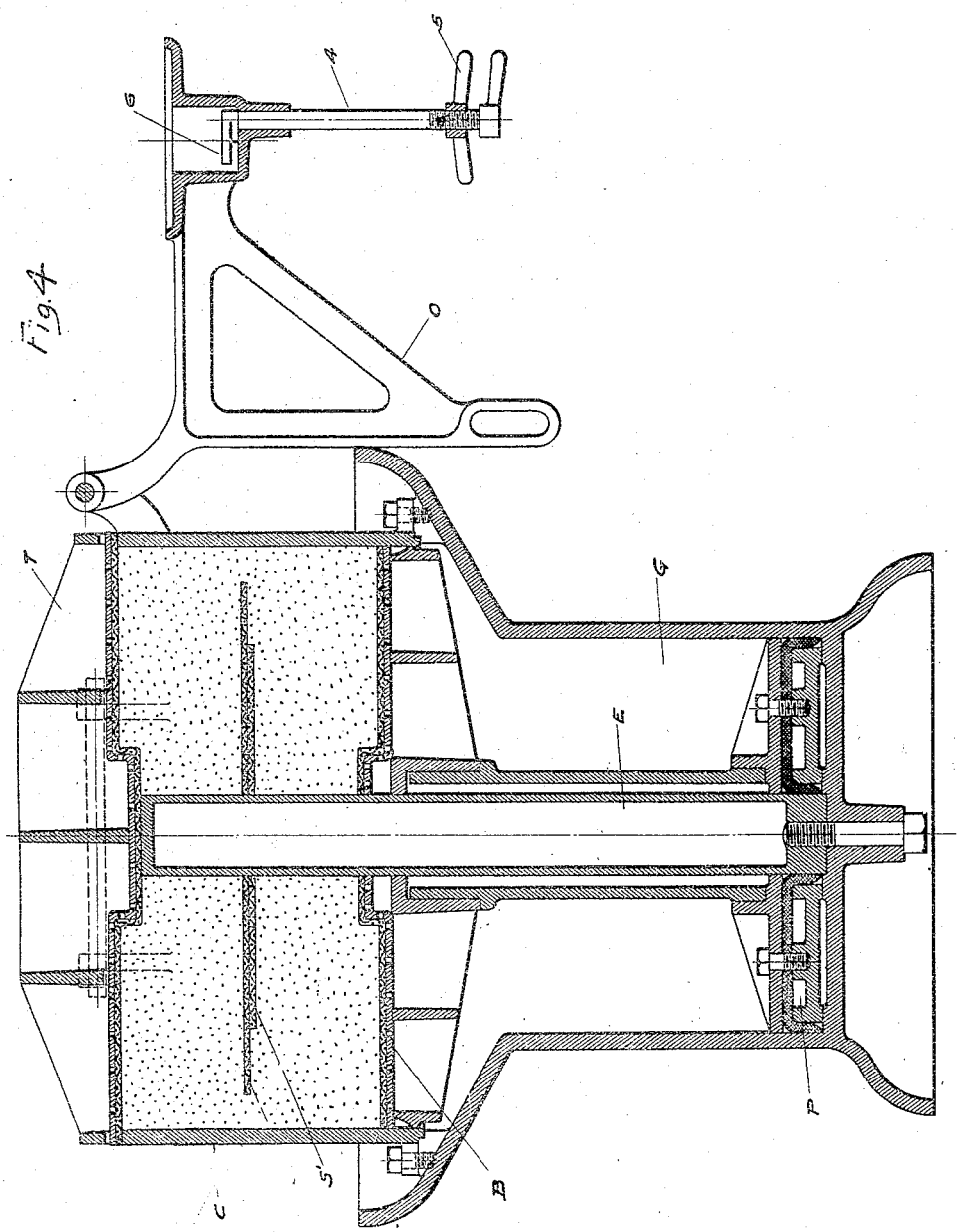
Figure 5:
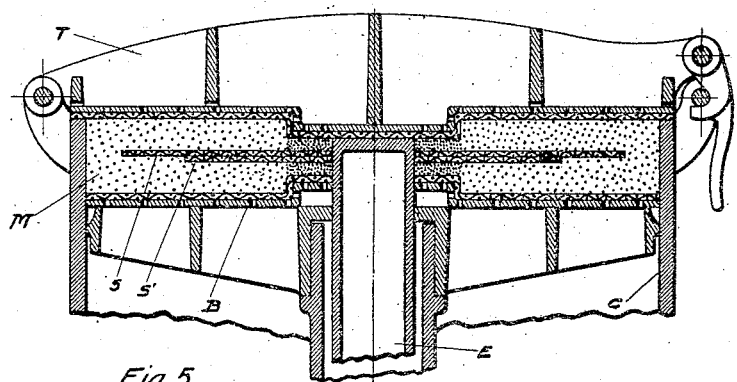
Figure 6:
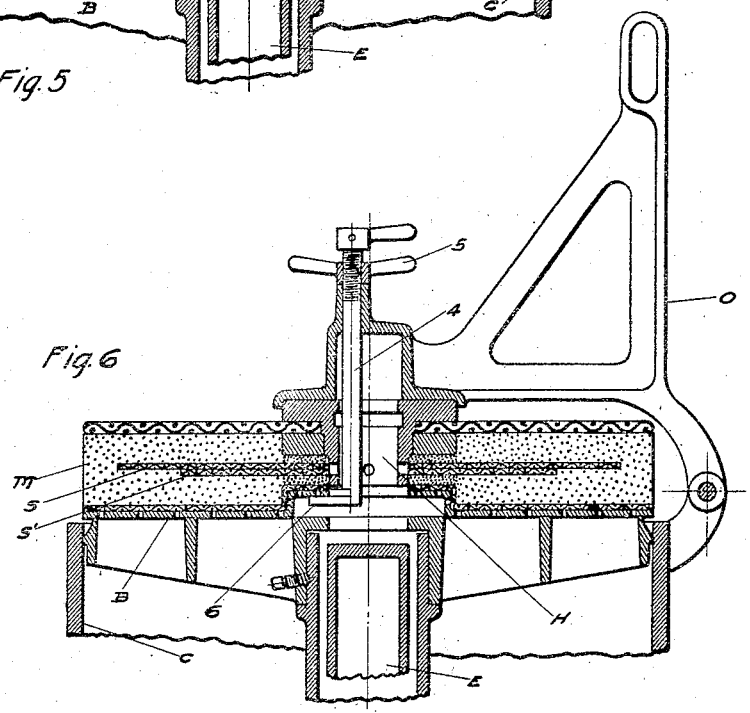

In the drawings, Figure 1 shows a cross-section through the novel liquid-conductor. Fig. 2 shows in detail three of the novel filter elements, the two lower ones superimposed, the upper one just being lowered. Fig. 3 shows a cross-section through the hydraulic press with cover opened and filled one-half with thin filter mass. Fig. 4 shows the same hydraulic press with enough mass for two filter layers inclosing the clear-liquid conductor. Fig. 5 shows the upper part of said hydraulic press with the filter mass in a compressed state. Fig. 6 shows an upper part of said hydraulic press with two filter layers raised so as to enable them to be taken from the machine with the reversing-tool inserted. Fig. 7 shows a part of the hydraulic press, the filter layers reversed by the reversing-tool, the lifting-tool inserted ready to take the filter layers from the press.

Fig. 1 shows the liquid-conductor for the conveyance of the cloudy liquid, consisting of a coarse-wire screen of about the diameter of the filter layers, having in its center a metal hub H with a central aperture. This hub H has flanges F and F', with which it rigidly grasps the coarse-wire liquid-conductor. It has holes 1 and an annular recess 2 for the purpose of inserting the lifting instrument described later.

In Fig. 2 the two lower filter elements are superimposed in the condition in which they are to be placed in the filter-drum. It will be seen that over compression of the filter mass is prevented when the metal parts of the hubs H come together on line N. It will also be seen that when a number of the filter elements with the hubs H are stacked one upon the other they form a continuous main tube or passage for the egress of the clear liquid collected from each independent filter element. The upper one, into which the lifting instrument L is inserted, is being lowered in place. M is the filtering mass of compressed pulp. It completely surrounds the two screen-disks S and S', of which S' is seen to be of smaller diameter. These screen-disks are of very fine mesh, fine enough so that when using fiber of the consistency in which it is generally used for packing filter layers it retains the filter fiber. I am calling it for short "fiber-retaining liquid-conductor." The meshes are about thirty to fifty wires to the inch, and it is best to use twilled cloth.

I have found that a single wire mat of the kind specified when completely surrounded with compressed paper-pulp is able to drain or supply two filter layers of a diameter of twenty-four inches each at the ordinary speed of filtration. I have, however, added a second fiber-retaining mat S' to the first one, for when the liquid moves toward the center the conduits are diminished, especially in the center, where the compressed pulp is compressed more than any other place, and a double mat will afford a freer outlet for the liquid. These fiber-retaining mats are pliable and elastic, and in order to be able to transport same they are carried by the liquid-conductor for the cloudy liquid. (Illustrated in detail in Fig. 1.)

It will be seen in Fig. 2 that the center of the filtering layer over the flanges F is more compressed than the rest of the mass. This is indicated by closer graining. These parts come in close contact when superimposed with the flanges F and F' of the inlet liquid-conductor. They act as a gasket to prevent the cloudy liquid from getting into the clear side of the filter. When superimposed it will be seen, Fig. 2, lower part, that the fiber-retaining mats are communicating with the holes 1 of hub H and there with the central hole in the hub, which is for the outlet of the clear liquid. If the center part of the filter layers in contact with the flanges F and F' were not compressed, very much of the cloudy liquid could creep along the metal flanges and pass through the holes 1 into the clear side of the filter. I have found in order to enable filtration under pressure that the filtering layer M should be compressed at the center to about from two to four times as densely as the rest of the filtering mass in order to make secure connection against the exit of the cloudy liquid. I have besides provided the flanges with grooves 3, as is commonly done on gasket-seats, in order to further obstruct the cloudy liquid from passing between the metal flanges F and the filtering medium.

I will remark here that when filtering with low pressure the filter mass need not be compressed as much. It perhaps need be compressed but twofold. The rule, therefore, is that the hydraulic pressure within the liquid to be filtered should not be any greater upon the square inch of the filtering medium opposite the flanges F than the pressure previously exerted upon the filtering medium at that part. It is better, however, to compress it more when building up the filter layer than not enough. Then one is sure that no cloudy liquid will pass into the clear side by compressing the parts of the filter layer in contact with the flanges F and F'.

How the filtering medium, as shown in Fig. 2, is produced in connection and conjunction with the inlet and outlet liquid-conductors I will proceed to describe.

Fig. 3 shows a hydraulic press which is patented to me in my Patent No. 797,122, August 15, 1905. This press consists of a large cylinder C, movable and perforated bottom B, swinging and perforated top T, center and stationary cylinder E, and hydraulic cylinder G, in which moves a piston P, that can be actuated by fluid controlled by valve V.

In order to produce the filter layer M, I fill the large cylinder C, Fig. 3, about half-full with the thin liquid pulp, thin enough to distribute itself fairly even. The thinner the pulp is used the more perfect the filter layer will be afterward. Hereupon I place the two fiber-retaining liquid-conductors S and S' in inverted order upon the filtering mass, the interior cylinder E being of such diameter that it closely fits the center hole within the mats S and S'. These liquid-conductors are very light and readily lie on the liquid filter mass. As quickly as possible I fill up the rest of the cylinder C with the filtering mass, as shown in Fig. 4, and close the top cover T. I now cause, by means of the valve V, the hydraulic piston P to rise, which being rigidly connected with the perforated bottom B causes the latter to also ascend within the cylinder C, compressing the water out of the pulp until the filter layer presents the appearance as shown in Fig. 5.

I will now describe how the center parts of the filter mass are more compressed than the rest of the filter layer. This is made possible in one operation by the fibrous nature of the fiber-pulp and by pressing out the water in two opposite directions only—namely, top and bottom. If the filtering-pulp was an absolute plastic material, the result would be a perfect homogeneous pulp layer. Now the plasticity of the filtering-pulp is lost with moisture, and while it is still compressible up to dryness it is not ductile. In the position shown in Fig. 5 the fibers around the center cannot escape from their place under a high pressure, as would be the case with a perfectly ductile material, but have to remain at their places. By pressing the water only in two opposite directions I keep the fiber in a horizontally relative position of rest within the pulp layer, and a more homogeneous filter layer is the result, while otherwise if I, for instance, were to extract the water from the sides of the cylinder the fiber would move in radial directions, following the water, and the result would be an imperfect layer.

The next operation the filter layer, in which is embedded the mats S and S', has to undergo is that of raising it out of the cylinder C, Fig. 6, and placing on it the cloudy-liquid conductor in an inverted condition, and if properly proportioned, the flanges F and F' will exactly fit into the more compressed circular parts around the center of the filter layers. In order to lift the filter layer away, I have to lift the perforated screen B with it, as otherwise the compressed filter mass M would fall off. This may be done by the lifting-arm O, having hook 4 and lock-nut 5, and finger 6. This lifting-arm O swings over the filter elements, as shown in Fig. 6. The hook 4 is introduced into the center hole and then turned one-half a turn, whereby the finger 6 takes hold under the perforated bottom plate B. By tightening the lock-nut 5 the filter layer, with bottom plate B, can be tightened to the lifting-arm, whereupon the lifting-arm O is swung back again one hundred and eighty degrees, which gives the position as shown in Fig. 7. Hook 4 in Fig. 7 is then released and dropped. The perforated plate B, that is not needed any more, is put back where it originally was, and the filtering elements, comprising the filtering mass M, mats S and S', and the cloudy-liquid conductor carrying the filter mass, may then be removed by inserting within the central aperture of the liquid-conductor the lifting instrument L.

It will be seen that the lifting instrument L is parabolically shaped on the lower end which serves for guiding the filter element Fig. 2, in the act of lowering it upon another one in order to center same properly.

What I claim, and desire to secure by Letters Patent, is—

1. In a filter, the combination of two filter layers of compressed pulp, interposed between them a circular inlet liquid-way with a central ring-shaped compression body having two horizontal compression-surfaces, whereby the filter layers where in contact therewith are more compressed than elsewhere, means for supplying unfiltered liquid to the inlet liquid-way and draining the filtered liquid from the filter layers.

2. In a filter a portable filter element consisting of a supporting circular inlet liquid-conductor having a central hub with central hole for the clear liquid, in combination with two filter layers of compressed fibrous pulp drained by a circular flat outlet liquid-conductor, said filter layers and liquid-conductor having central openings registering with the central hole of the supporting inlet liquid-conductor, and admitting of the introduction of means for taking hold of the supporting liquid-conductor.

3. In a filter an inlet liquid-conductor consisting of a single circular and stiff manufacture adapted to conduct liquid radially to two filter layers of compressed fibrous pulp in contact on both sides of said disk, and having a central compression body with impervious ring-shaped surfaces compressing the filter layers at their point of contact with said surfaces more densely than the rest of said filter layers.

4. In a filter, the combination of two filter layers of compressed pulp, interposed between them a circular inlet liquid-way with a central ring-shaped compression body having two horizontal compression-surfaces, whereby the filter layers where in contact therewith are practically compressed to non-porosity, means for supplying unfiltered liquid to the inlet liquid-way and draining the filtered liquid from the filter layers.

5. In a filter an inlet liquid-conductor supplying two filter layers and consisting of a single open-work disk with a ring-shaped compression body in its center, said compression body having horizontal ring-shaped faces, and vertical annulus, forming when superposed with the neighboring liquid-conductors, an intercommunicating opening for the clear liquid, in combination with filter layers of compressed fibrous pulp supplied by said inlet liquid-conductors, and with outlet liquid-conductors draining said filter layers from the clear liquid.

6. In a filter a portable filter element consisting of, two filter layers of fibrous compressed pulp, of an outlet liquid-conductor draining two filter layers, of an inlet liquid-conductor supporting the two filter layers and outlet liquid-conductor and being adapted to be taken hold of centrally for the purpose of inserting the whole element into the filter or extricating it therefrom, and of means to take hold of said liquid-conductor.

7. In a filter the combination with an inlet liquid-conductor supplying two filter layers, having a central compression body and a vertical central annulus, of filter layers of compressed fibrous pulp having depressions to correspond with the compression body mentioned, of an outlet liquid-conductor between two filter layers with a central opening to correspond and to center itself with the vertical annulus of the inlet liquid-conductor, and of means for supplying the inlet liquid-conductors with cloudy liquid and draining the outlet liquid-conductors.

8. In a filter the combination of a series of filter elements each consisting, of an inlet liquid-conductor (supplying two filter layers) of coarse-wire screen having a central compression body considerably thicker than said liquid-conductor and having a central opening for the clear liquid in said compression body, of a pair of filter layers, the lower of which having a circular depression to correspond with the upper half of the compression body of the supporting inlet liquid-conductor, the upper filter layer having a similar depression to correspond with the lower half of the compression body of the neighboring inlet liquid-conductor, of an outlet liquid-conductor between the two filter layers with outlet facilities between two compression bodies of neighboring inlet liquid-conductors and connecting with the central intercommunicating opening formed by all compression bodies, and with means for supplying the inlet liquid-conductors with cloudy liquid and draining the outlet liquid-conductors.

9. In a filter the combination of a series of filter elements each consisting, of an inlet liquid-conductor (supplying two filter layers) of a single open-work manufacture having a central compression body with a central opening for the clear liquid, of a pair of filter layers, the lower of which having a circular depression to correspond with the upper half of the compression body of the supporting inlet liquid-conductor, the upper filter layer having a similar depression to correspond with the lower half of the compression body of the neighboring inlet liquid-conductor, of an outlet liquid-conductor between the two filter layers with outlet facilities between two compression bodies of neighboring inlet liquid-conductors and connecting with the central intercommunicating openings formed by all compression bodies; and with means for supplying the inlet liquid-conductors with cloudy liquid and draining the outlet liquid-conductors.

10. In a filter, the combination of two filter layers of compressed pulp, a circular inlet liquid-way interposed between them with an annular ring-shaped compression body having two compression-surfaces, whereby the filter layers where in contact therewith are more compressed than elsewhere, means for supplying unfiltered liquid to the inlet liquidway and draining the filtered liquid from the filter layers.

11. In a filter, the combination of two filter layers of compressed fibrous pulp, of a circular inlet liquid-conductor, of rigid manufacture, interposed between and supplying them, a central compression body with impervious ring-shaped surfaces connected with said liquid-conductor and serving to compress the filter layers at their point of contact with said surfaces more densely than elsewhere.

12. In a filter, the combination with an inlet liquid-conductor, supplying two filter layers, a central compression body and vertical central annulus, of filter layers of compressed fibrous pulp, parts of which filter layers are in intimate contact with the compression body mentioned, of an outlet liquid-conductor, between and draining two filter layers, said liquid-conductor having a central opening to correspond and to center itself with the vertical annulus of the inlet liquid-conductor, and of means for supplying the inlet liquid-conductors with cloudy liquid and draining the outlet liquid-conductors.

In testimony whereof I have signed my name to this specification in the presence of two subscribing witnesses.

KARL KIEFER.

Witnesses:
G. W. WERDEN,
H. L. RAMBEAU.